US011665728B2

(12) United States Patent
Cheong et al.

(10) Patent No.: US 11,665,728 B2
(45) Date of Patent: May 30, 2023

(54) MULTI-BAND SIMULTANEOUS SWITCHING SYSTEM AND METHOD OF USING THE SAME

(71) Applicant: Dell Products, L.P., Round Rock, TX (US)

(72) Inventors: Minho Cheong, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/951,068

(22) Filed: Nov. 18, 2020

(65) Prior Publication Data

US 2022/0159664 A1 May 19, 2022

(51) Int. Cl.
*H04W 72/08* (2009.01)
*H04W 72/542* (2023.01)
*H04W 56/00* (2009.01)
*H04W 76/15* (2018.01)

(52) U.S. Cl.
CPC ....... *H04W 72/542* (2023.01); *H04W 56/001* (2013.01); *H04W 76/15* (2018.02)

(58) Field of Classification Search
CPC ........... H04W 72/085; H04W 72/0433; H04W 72/08; H04W 56/001; H04W 76/15; H04W 76/20; H04W 36/0022; H04W 36/0011; H04W 36/0066; H04W 36/00837; H04W 36/16; H04W 36/18; H04W 36/22; H04W 36/24; H04W 36/38; H04W 40/34; H04W 40/36; H04W 88/12; H04L 67/14
See application file for complete search history.

(56) References Cited

U.S. PATENT DOCUMENTS

| 11,140,457 | B1* | 10/2021 | Jordan | H04N 21/64738 |
|---|---|---|---|---|
| 2011/0070842 | A1* | 3/2011 | Kwon | H04W 72/0453 455/67.13 |
| 2012/0182954 | A1* | 7/2012 | Cordeiro | H04L 5/0092 370/329 |
| 2014/0269468 | A1* | 9/2014 | Jia | H04W 24/02 370/311 |
| 2015/0026453 | A1* | 1/2015 | Liu | H04W 12/069 713/151 |
| 2015/0056995 | A1* | 2/2015 | Baillargeon | H04W 36/00837 455/436 |
| 2016/0127957 | A1* | 5/2016 | Nylander | H04W 52/0209 370/331 |

(Continued)

*Primary Examiner* — Sudesh M Patidar
(74) *Attorney, Agent, or Firm* — Fogarty LLP

(57) ABSTRACT

An Information Handling System (IHS) includes executable instructions for establishing a communication session conveyed through a first band provided by an access point having a multi-band simultaneous protocol. When the instructions determine that the communication session should be conveyed through a second band provided by the access point (AP), they transmit one or more communication session parameters associated with the communication session to the access point to prepare a second band provided by the AP to convey the communication session. After transmitting the communication session parameters to the second band MAC component of the IHS and the second band MAC component of the AP, the instructions then initiate a switch over to the second band.

16 Claims, 6 Drawing Sheets

(56) References Cited

U.S. PATENT DOCUMENTS

| | | | |
|---|---|---|---|
| 2016/0227535 A1* | 8/2016 | Sharma | H04W 72/1215 |
| 2016/0309481 A1* | 10/2016 | Verma | H04W 28/0231 |
| 2017/0071022 A1* | 3/2017 | Sampath | H04W 48/18 |
| 2017/0111854 A1* | 4/2017 | Ho | H04W 36/22 |
| 2017/0311328 A1* | 10/2017 | Urabe | H04W 40/005 |
| 2019/0373439 A1* | 12/2019 | Abouelseoud | H04B 7/0695 |
| 2020/0022201 A1* | 1/2020 | Ross | H04W 72/046 |
| 2020/0396667 A1* | 12/2020 | Kaasalainen | H04W 36/22 |
| 2021/0007023 A1* | 1/2021 | Umapathy | H04W 36/00837 |

\* cited by examiner

MULTI-BAND SIMULTANEOUS SWITCHING SYSTEM AND METHOD OF USING THE SAME

FIELD

This disclosure relates generally to Information Handling Systems (IHSs), and more specifically, to a multi-band simultaneous switching system and method of using the same.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communications via a network to a server IHS to retrieve and store information. For example, a client IHS may communicate with a network through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface).

Modern WLAN protocols include the use of multiple bands. Generally speaking, a band refers to a small contiguous section of the radio-frequency (RF) spectrum that provides a channel for communication. Newer WLAN protocols are now provided with multi-band simultaneous (e.g., dual band simultaneous (DBS), tri band simultaneous (TBS), etc.) operation in which traffic can be simultaneously communicated over multiple channels. One particular component of these multi-band simultaneous protocols involves a fast session transfer (FST) feature that functions at the media access control (MAC) layer to provide switch over of active sessions from one band of operation to another.

As the inventors hereof have recognized, however, current implementations of the FST switching feature often cause excessive latency between such switchover operations such that ongoing sessions are often dropped or canceled. To address these, and other problems, the inventors hereof have developed systems and methods for providing a simultaneous or near-simultaneous switching of communication sessions in a multi-band simultaneous network.

SUMMARY

According to one embodiment, an Information Handling System (IHS) includes executable instructions for establishing a communication session conveyed through a first band provided by an access point having a multi-band simultaneous protocol. During the communication session, when the instructions determine that the communication session should be conveyed through a second band provided by the access point (AP), they transmit one or more communication session parameters associated with the communication session to the access point to prepare a second band MAC component of a second band provided by the AP to convey the communication session, and transmit the communication session parameters to a second band MAC component of the IHS to prepare the second band MAC component of the IHS to convey the communication session over the second band. After transmitting the communication session parameters to the second band MAC component of the IHS and the second band MAC component of the AP, the instructions then initiate a switch over to the second band.

According to another embodiment, a method includes establishing a communication session conveyed through a first band provided by an access point having a multi-band simultaneous protocol. During the communication session, when the instructions determine that the communication session should be conveyed through a second band provided by the access point (AP), the method transmits one or more communication session parameters associated with the communication session to the access point to prepare a second band MAC component of a second band provided by the AP to convey the communication session, and transmits the communication session parameters to a second band MAC component of the IHS to prepare the second band MAC component of the IHS to convey the communication session over the second band. After transmitting the communication session parameters to the second band MAC component of the IHS and the second band MAC component of the AP, the method then initiates a switch over to the second band.

According to yet another embodiment, a memory device stores instructions for establishing a communication session conveyed through a first band provided by an access point having a multi-band simultaneous protocol. During the communication session, when the instructions determine that the communication session should be conveyed through a second band provided by the access point (AP), they transmit one or more communication session parameters associated with the communication session to the access point to prepare a second band MAC component of a second band provided by the AP to convey the communication session, and transmit the communication session parameters to a second band MAC component of the IHS to prepare the second band MAC component of the IHS to convey the communication session over the second band. After transmitting the communication session parameters to the second band MAC component of the IHS and the second band MAC component of the AP, the instructions then initiate a switch over to the second band.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments of the present disclosure provide a switching system and method that provides instantaneous (seamless) or near-instantaneous switchover in a multi-band simultaneous wireless network. Whereas traditional switching systems used in a multi-band simultaneous wireless network are triggered by a remotely configured access point (AP), they are inherently limited in maintaining an awareness of ever changing conditions that may occur with applications running on an IHS that use the multi-band simultaneous wireless network. Embodiments of the present disclosure provide a solution to this problem by implementing a service executed on the IHS that maintains a continual awareness of the conditions of communication sessions used by applications executed on the IHS such that, should a communication session of one band of the multi-band simultaneous wireless network deteriorate to a substantial degree, a trigger may be generated by a client, such as an application executed on the IHS, to initiate a switchover operation in a timely manner. Additionally, the service may respond to certain applications executed on the IHS so that the multi-band simultaneous wireless network may be responsive to the specific, immediate needs of each application so that dropped or canceled sessions may be remediated or avoided.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
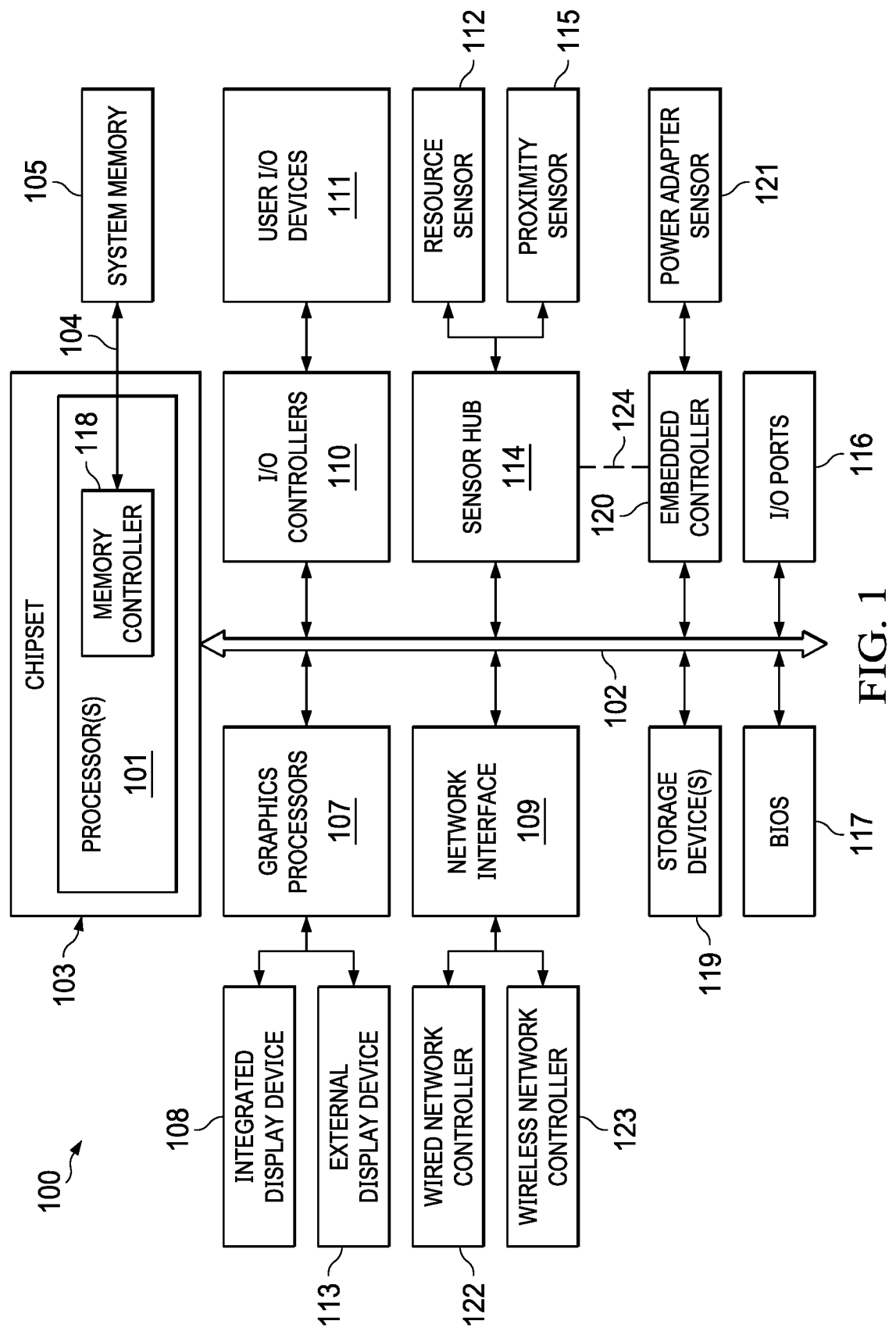
FIG. 1 is block diagram of an example of components of an Information Handling System (IHS) configured to implement systems and methods for performing a switch over in a multi-band simultaneous network according to one embodiment of the present disclosure.

FIG. 1 is a block diagram illustrating components of example IHS 100 configured to manage a communication link with a wireless docking station according to one embodiment of the present disclosure. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removable couplings with various types of external devices and systems, including removable couplings with peripheral devices that may be configured for operation by a particular user of IHS 100. For instance, I/O ports 116 may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 111 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to the processor(s) 101 of the IHS 100 through the chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and 113, coupled to IHS 100.

One or more display devices 108 and 113 coupled to IHS 100 may utilize LCD, LED, OLED, or other display technologies. Each display device 108 and 113 may be capable of receiving touch inputs such as via a touch controller that may be an embedded component of the display device 108 and 113 or graphics processor 107, or it may be a separate component of IHS 100 accessed via bus 102. In some cases, power to graphics processor 107, integrated display device 108 and/or external display device 133 may be turned off, or configured to operate at minimal power levels, in response to IHS 100 entering a low-power state (e.g., standby).

As illustrated, IHS 100 may support an integrated display device 108, such as a display integrated into a laptop, tablet, 2-in-1 convertible device, or mobile device. IHS 101 may also support use of one or more external display devices 113, such as external monitors that may be coupled to IHS 100 via various types of couplings, such as by connecting a cable from the external display 113 to external I/O port 116 of the IHS 100. In certain scenarios, the operation of integrated display devices 108 and external display devices 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 capable of sampling and/or collecting data from a variety of sensors. For instance, sensor hub 114 may utilize hardware resource sensor(s) 112, which may include electrical current or voltage sensors, and that are capable of determining the power consumption of various components of IHS 100 (e.g., CPU 101, GPU 107, system memory 105, etc.). In certain embodiments, sensor hub 114 may also include capabilities for determining a location and movement of IHS 100 based on triangulation of network signal information and/or based on information accessible via the OS or a location subsystem, such as a GPS module.

In some embodiments, sensor hub 114 may support proximity sensor(s) 115, including optical, infrared, and/or sonar sensors, which may be configured to provide an indication of a user's presence near IHS 100, absence from IHS 100, and/or distance from IHS 100 (e.g., near-field, mid-field, or far-field).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions.

EC 120 may also implement operations for interfacing with power adapter sensor 121 in managing power for IHS 100. These operations may be utilized to determine the power status of IHS 100, such as whether IHS 100 is operating from battery power or is plugged into an AC power source (e.g., whether the IHS is operating in AC-only mode, DC-only mode, or AC+DC mode). In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
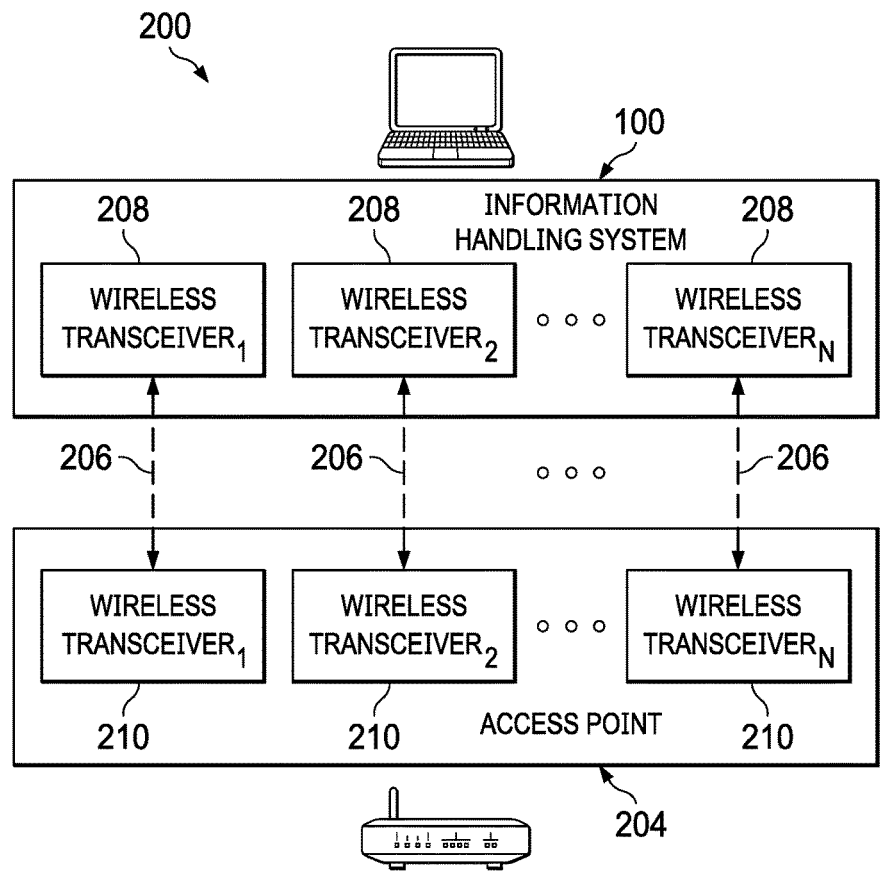
FIG. 2 is block diagram of a multi-band simultaneous network for performing the switch over according to one embodiment of the present disclosure.

FIG. 2 is block diagram of a multi-band simultaneous network 200 that can be used for performing the switch over according to one embodiment of the present disclosure. Multi-band simultaneous network 200 includes IHS 100 in communication with an access point 204 via multiple available bands 206, each functioning at a different range of frequencies using wireless transceivers 208 configured in IHS 100 as well as transceivers 210 configured in access point 204.

Multi-band simultaneous network 200 may include any network topology that conforms to a multi-band simultaneous (e.g., dual band simultaneous (TBS), tri band simultaneous (TBS), etc.) specification. Within the multi-band simultaneous specification, IHS may be referred to as a station (STA). Additionally, access point 204 may be a router or other device that communicates with IHS 100 over multiple bands simultaneously, and in some cases, forwards traffic conveyed between itself and IHS 100 to other networks, such as the Internet.

A band refers to a small contiguous section of the radio-frequency (RF) spectrum that provides a channel for communication. In the particular case of one used by the multi-band simultaneous device, a band may be those used by a Wi-Fi protocol based on the IEEE 802.11 family of standards, such as a 2.4 GHz band, a 5 GHz band, and/or a 60 GHz band.

Although the wireless channel selection management system is shown and described as being implemented on an IHS and an access point configured as a router, it is contemplated that the system 200 may be include any suitable electronic device that wirelessly communicates with another electronic device using a multi-band simultaneous protocol without departing from the spirit and scope of the present disclosure.

As mentioned previously, Wi-Fi specification includes a family of IEEE 802.11 standards that are augmented at an ongoing basis to enhance the capabilities of the Wi-Fi specification. Starting with the 802.11n standard, Wi-Fi standards include simultaneous dual-band 2.4 GHz and 5 GHz support as a standard feature. By supplying separate wireless interfaces for each band, dual-band 802.11n access points (e.g., routers) may provide relatively good flexibility when setting up a network.

Some home devices require legacy compatibility and greater signal reach that the 2.4 GHz band offers, while others may require the additional network bandwidth that the 5 GHz band offers. Access points having multi-band simultaneous capabilities may provide connection links designed for the needs of each. For example, many Wi-Fi home networks suffer from wireless interference arising from the prevalence of 2.4 GHz consumer gadgets, like cordless phones, which utilize Frequency Hopping Spread Spectrum modulation where the signal continually jumps around the 2.4 GHz spectrum rather than using a single channel. Microwave ovens may also interfere with wireless signals due to the radio signals they 'leak' during operation. The ability to use the 5 GHz band on a router avoids these problems because the technology can support 23 non-overlapping channels in many cases.

The 802.11ad specification also supports a "fast session transfer" feature, which enables wireless devices to seamlessly transition between the 60 GHz frequency band and the legacy 2.4 GHz and 5 GHz bands. The fast session transfer feature of the 802.11ad specification, however, only specifies triggering a switchover by the access point. This limitation of the fast session transfer can be burdensome because, although applications may recognize the need for performing a switchover, they need to wait until the access point is able to recognize this need. What eventually results is excessive latency that often causes ongoing sessions established by those applications to be prematurely dropped or canceled. Embodiments of the present disclosure provide a solution to this problem by providing a switchover mechanism at the station side (IHS) of a multi-band simultaneous network so that an application or other service executed on the station can initiate a switchover that can occur instantaneously or near-instantaneously.

Figure 3:
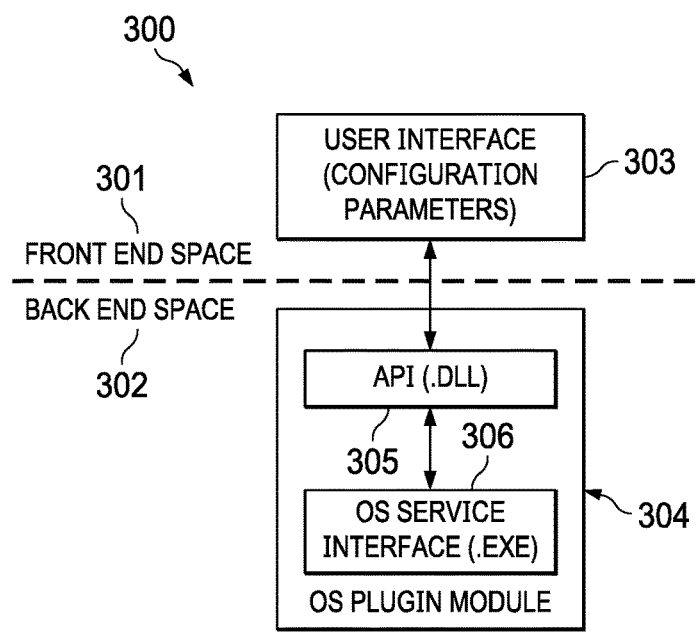
FIG. 3 is a block diagram of an example communication session switching service according to one embodiment of the present disclosure

FIG. 3 is a block diagram of an example communication session switching service 300. In some embodiments, communication session switching service 300 may be instantiated through the execution of program instructions 124A by processor 102 of IHS 100. As shown, user interface (UI) 303 may provide a graphical UI (GUI) in front end space 301 configured to receive one or more configuration parameters, such as from a user. For example, UI 303 may receive, as configuration parameters, a user's selection of QoS indicator(s), threshold(s), and/or context information (e.g., application type, proximity-based, posture-based, etc.), usable by communication session switching service 300 to determine when to enable or disable communication session switching service 300 in addition to selecting one or more desired performance parameters to be assigned to a communication session used by an application.

UI 303 may pass configuration parameters to an OS plug-in module 304 in back end space 302, which includes an API 305 (a dynamic-link library or DLL, etc.) and an OS service interface 306 (e.g., an executable) that communicates with a multi-band simultaneous network stack configured on IHS 100. In some implementations, OS service interface 306 may be configured to receive requests from applications executed on IHS 100, and for communicating with the multi-band simultaneous wireless network stack for establishing a communication session over the multi-band simultaneous enabled network.

Figure 4:
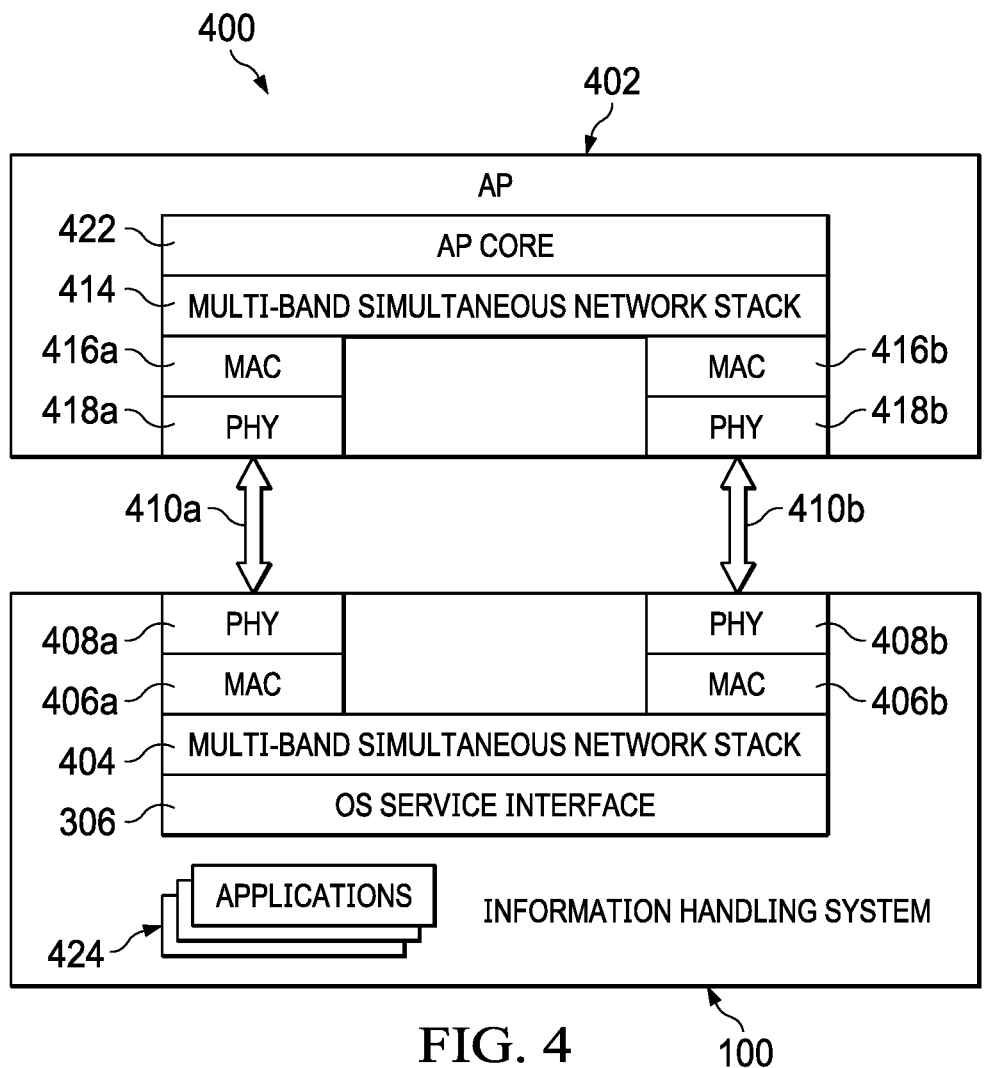
FIG. 4 illustrates a block diagram of an example multi-band simultaneous network switching system according to one embodiment of the present disclosure

FIG. 4 illustrates a block diagram of an example multi-band simultaneous network switching system 400. Multi-band simultaneous network switching system 400 includes IHS 100 in communication with an access point (AP) 402, such as a router having multi-band simultaneous capabilities, using multiple bands 410*a*, 410*b* that each individually provides a channel for communication. AP 402 may be, for example, a router or other computer-based entity that communicates according to the multi-band simultaneous protocol.

IHS 100 includes a multi-band simultaneous network stack 404 that includes a MAC layer component 406, and a physical (PHY) layer component 408*a*, 408*b* for each band 410 (e.g., 2.4 GHz band, 5.0 GHz band, 60 GHz band, etc.) provided by multi-band simultaneous stack 404. Multi-band simultaneous wireless network stack 404 may be administered by OS service interface 306 such as described above with reference to FIG. 3. In a like manner, AP 402 includes a multi-band simultaneous network stack 414 that includes a MAC layer component 416, and a physical (PHY) layer component 418*a*, 418*b* for each band 410 provided by its multi-band simultaneous stack 414. As will be described in detail herein below, OS service interface 306 continually monitors one or more performance parameters of active bands 410*a*, 410*b*, and for each communication session conveyed between IHS 100 and AP 402, selects a band 410*a*,

410b that optimally meets the requirements of that communication session. AP 402 may also include an AP core 422 that provides certain functions associated with overall operation of AP 402.

In one embodiment, OS service interface 306 is responsive to one or more applications 424 executed on IHS 100 to select a band 410 that optimally meets the communication sessions requirements associated with each application 424. For example, a SKYPE application 424 upon establishing a voice communication session with AP 402 may transmit one or more specified performance requirements associated with the voice communication session to OS service interface 306 so that it can select a particular band 410 having relatively low latency (burstyness) due to the voice communication session's susceptibility to such characteristics. While the communication session is in progress, OS service interface 306 continues to monitor the conditions of each band 410, and performs a switch over to another band 410 if the band 410 on which the voice communication session was initially established fails to meet the specified requirements below a threshold level. As another example, OS service interface 306 may select another, different band 410 for conveying a data communication session used by a browser application 424 in which the performance requirements are associated with optimal data throughput (bandwidth).

The multi-band simultaneous switching system 400 may employ any suitable protocol that uses multiple bands 410 or channels to convey traffic from one node to another. For example, multi-band simultaneous switching system 400 may employ a dual-band simultaneous (DBS) protocol that simultaneously conveys data over two bands, or a tri band simultaneous (TBS) protocol that simultaneously conveys data over three bands. Other switching systems implementing four or more bands or channels may exist. Bands 410 generally refer to a small contiguous section of the radio-frequency (RF) spectrum that may be used to convey data between IHS 100 and AP 402. Given the IEEE 802.11 suite, available bands may include, for example, a 2.4 GHz band, a 5.0 GHz band, and a 60 GHz band.

The multi-band simultaneous protocol may also implement a fast session transfer (FST) feature. The FST feature is a MAC layer feature of the 802.11 protocol suite that provides switch over for communication sessions established via multi-band simultaneous enabled systems. For example, if a better range is desired, then a communication session may be transferred from 60 GHz to 5 GHz while sacrificing throughput. One particular drawback of the FST protocol, however, is that switch over is specified to be triggered at AP 402; that is, remotely from where applications 424 are executed, namely on IHS 100. As such, applications 424, which use communication sessions having vastly different performance requirements, are inhibited from selecting and using a band 410 that optimally provides a performance level according to those requirements. Embodiments of the present disclosure provide a solution to this problem, among other problems, by implementing an OS service interface 306 that continually monitors one or more performance parameters of each band 410 of a multi-band simultaneous system so that one band may be selected for use that optimally provides the performance requirements of each application 424.

As described herein, each application 424 executed by IHS 100 may possess a different functionality and have different requirements. Each application 424 may also have different reliability needs, such as priority level, maximum latency, or other QoS requirements in order to provide a sufficient experience to the end user. Also, each application 424 may have different types of traffic associated with its use (e.g., audio and video for a video conferencing call etc.). Yet conventional switch over mechanisms, such as the FST feature of the multi-band simultaneous protocol, distribute oncoming packets over available links without considering the specific requirements of each application. In contrast, the switching system and method described herein may cause a multi-band simultaneous enabled system to switch to between bands based upon the needs of each application used in IHS 100. Performance parameters that may dictate an application QoS may include, for example: priority, bitrate for each of the application's subsystems, latency, and/or reliability.

The communication session managed and switched by multi-band simultaneous switching system 400 may include any type of connection between two nodes (e.g., IHS 100 and AP 402), such as one established for an application 424, one established within the constraints of a login session, one established between two nodes having a previously established connection link agreement, and the like. For example, the communication session may be a voice over IP (VoIP) session established by a telecommunications application, such as a SKYPE, ZOOM, or WEBEX application. As another example, the communication session may be a communication session established for use by an online gaming application.

Communication sessions established for latency-sensitive applications such as these are often disconnected whenever the currently ongoing Wi-Fi connection becomes weak or unstable. For example, a SKYPE-based communication session often requires an average of ten seconds when a switch over occurs using the conventional FST switching feature of the multi-band simultaneous wireless network. Certain embodiments of the present disclosure may provide switch over of a SKYPE-based communication instantaneously or near-instantaneously such that communication session may not necessarily be disconnected.

Although the teachings of the present disclosure are described as being directed to a communication session established for an application 424, it is contemplated that other embodiments may perform a switch over for all traffic conveyed over a first band to a second band (e.g., one shot switching), all traffic categorized according to a certain access category (AC) (e.g., audio, video, data, etc.), and/or all traffic based on characteristics (e.g., source address, destination address, etc.) of each packet conveyed through the first band (e.g., packet-by-packet switching) without departing from the spirit and scope of the present disclosure.

As previously described, each of IHS 100 and AP 402 include a multi-band simultaneous network stack 404, 414 for each band 410. In order to establish a communication session, the MAC layer 406, 416 of each stack 404, 414 maintains certain parameters that are associated with the operation of the communication session. Example of such parameters may include a channel number, a required bandwidth, a planned switching time/duration, a type of switching mechanism (e.g., one shot switching, AC-by-AC switching, packet-by-packet switching, etc.), and an estimated asynchronous delta between bands (a.k.a., pre-determined stack delay). When a switch over occurs, multi-band simultaneous network stack 404, 414 needs to forward those parameters to the MAC layer component 406b, 416b of both multi-band simultaneous stacks involved with the target band 410b of operation. Because the forwarding of those parameters does consume a non-trivial amount of time, the estimated asynchronous delay between bands parameter specifies how long the target band 410 is to wait before conveying data traffic over the target band 410.

Embodiments of the present disclosure may provide an advantage over conventional FST switching techniques in that, due to triggering of the switch over at IHS 100, degradation of a currently used band 410, which the multi-band simultaneous network stack 414 in AP 402 cannot reliably detect, can be preemptively fixed while the communication session is still established over the currently used band 410 of operation.

Figure 5:
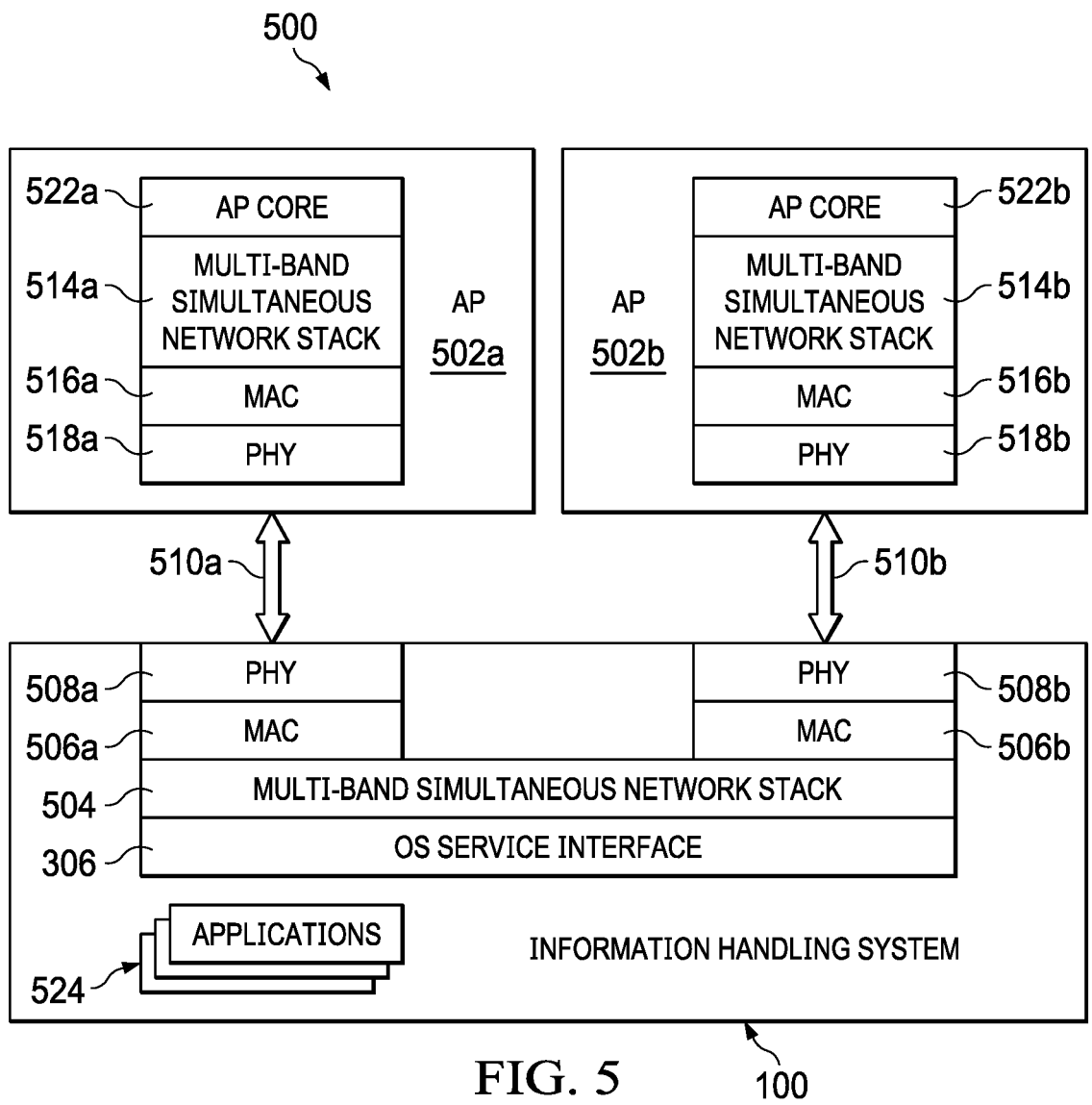
FIG. 5 illustrates a block diagram of another example multi-band simultaneous switching system according to one embodiment of the present disclosure

FIG. 5 illustrates a block diagram of another example multi-band simultaneous switching system 500. Multi-band simultaneous network switching system 500 includes an IHS 100 having multiple multi-band simultaneous stacks 504 for a corresponding number of bands 510, which are similar in design and construction to multi-band simultaneous stack 404, bands 410, and an OS service interface 306 of FIG. 4. For example, IHS 100 includes multiple applications 524 along with a MAC layer component 506a, 506b, and a physical (PHY) layer component 508a, 508b for each band 510a, 510b. Multi-band simultaneous switching system 500 differs, however, in that it includes two separate and distinct APs 502a, 502b each in communication with IHS 100 using different bands 510a, 510b of operation. In this particular example, each AP 502a, 502b has an AP core 522a, 522b, a multi-band simultaneous stack 514a, 514b, a MAC layer 516a, 516b, and a physical layer component 518a, 518b for each band 510a, 510b of communication with IHS 100. Such a case may exist, for example, where AP 502a is a router is configured for operation at the 2.4 GHz band, while AP 502b is workstation or other computing device configured for operation at the 5.0 GHz band of operation.

Conditions may exist where IHS 100 forms communication sessions predominantly for transmission to APs 502a, 502b; that is, the communication sessions mostly convey traffic from IHS 100 to APs 502a, 502b. For example, IHS 100 may function as a host to serve broadcast content to one or more recipients. In such a case, multi-band simultaneous switching system 500 may be configured on IHS 100 so that the broadcast content may be quickly and efficiently switched over from a first band 510a to a second band 510b having the required level of performance to handle such broadcast content.

Figure 6A:
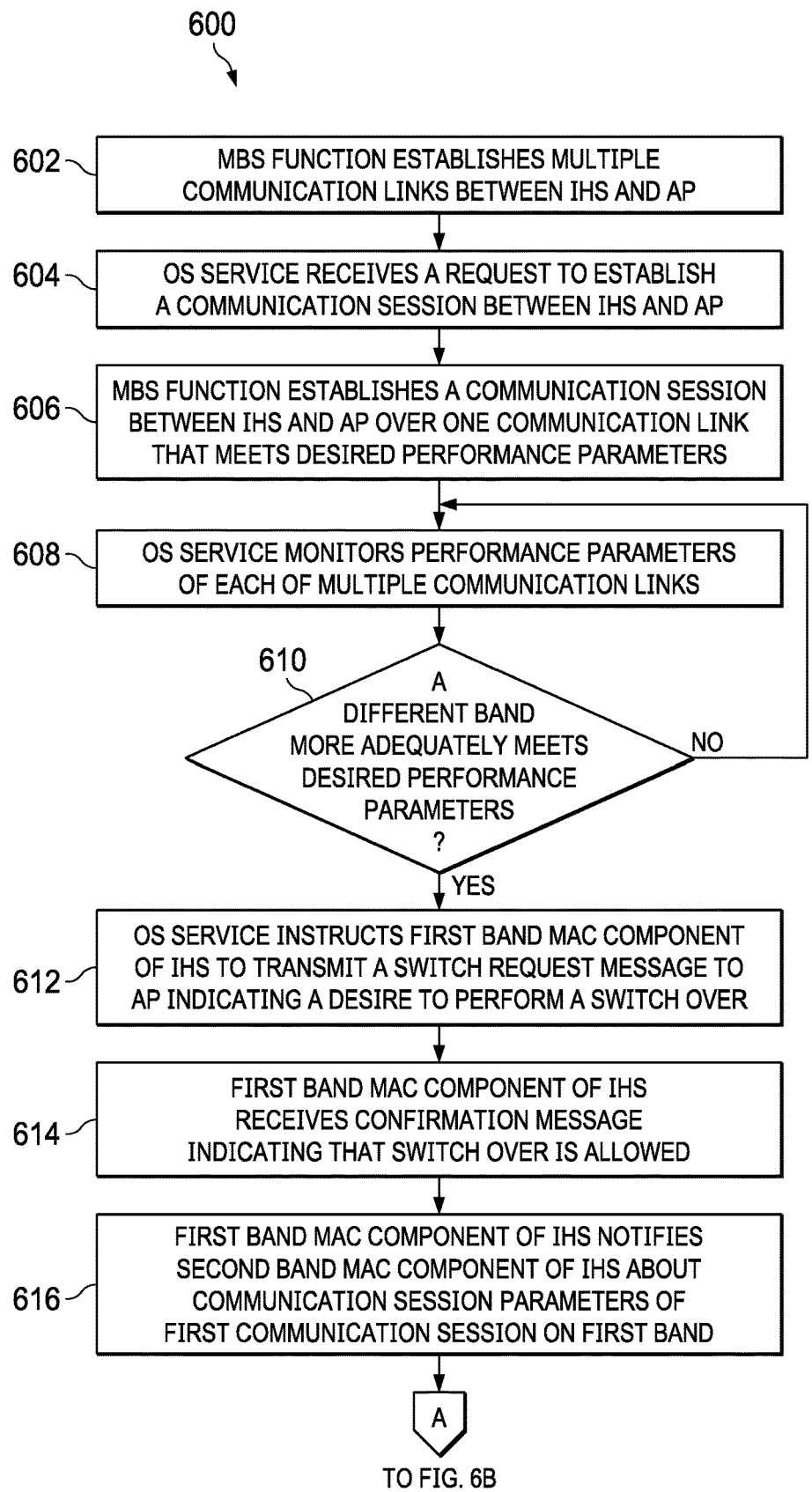
FIGS. 6A and 6B illustrates a flowchart of an example method for switching a communication session in a multi-band simultaneous wireless network according to one embodiment of the present disclosure
Figure 6B:
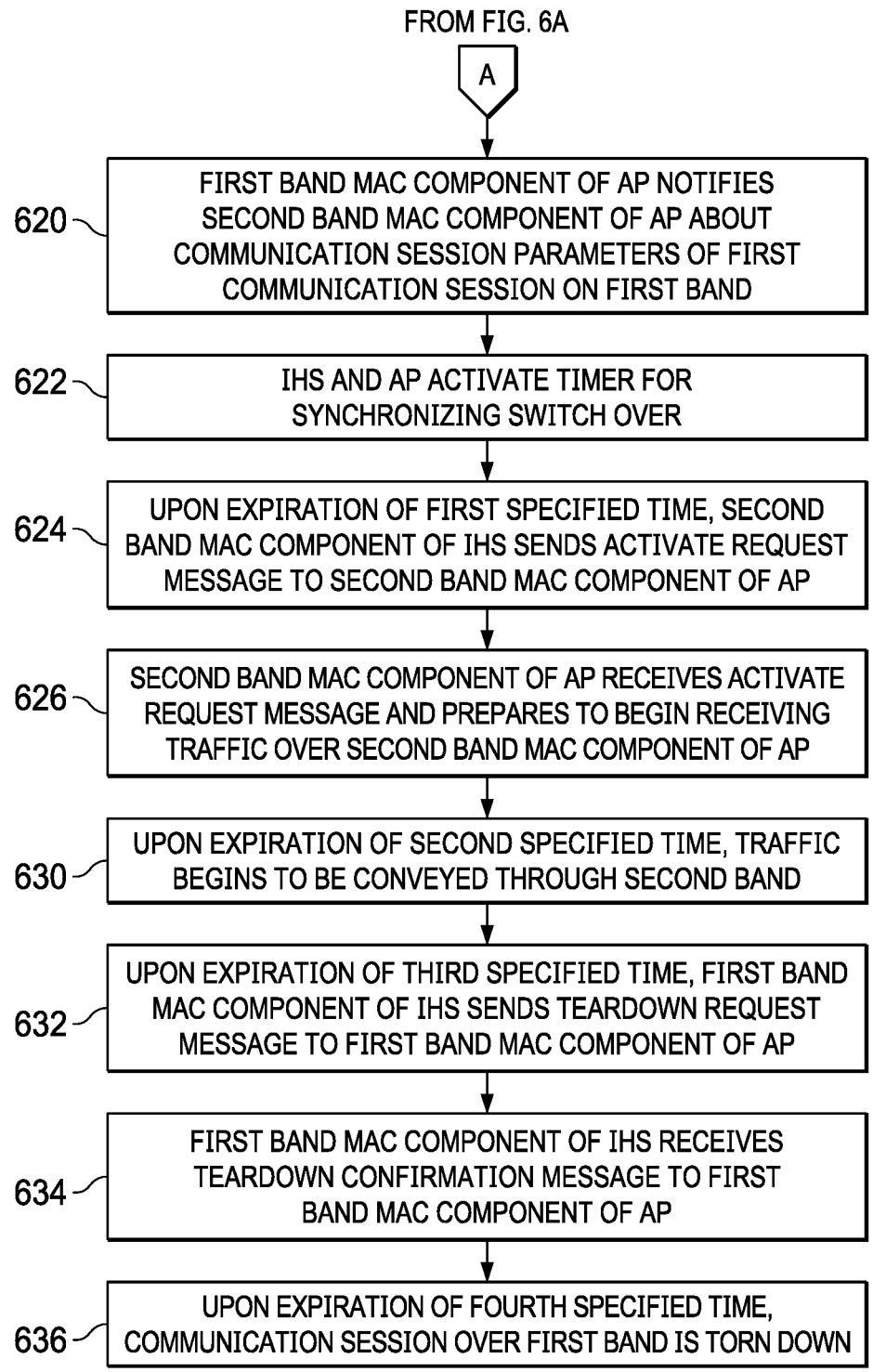

FIGS. 6A and 6B illustrate a flowchart of an example of method 600 for switching a communication session in a multi-band simultaneous wireless network. In some embodiments, method 600 may be performed, at least in part, by OS service interface 306 implemented in connection with the MAC layer components of multi-band simultaneous stacks 404, 414 configured in IHS 100 and AP 402.

Initially at step 602, multi-band simultaneous network stacks 404, 414 establishes multiple communication links between IHS 100 and AP 402 using multiple available bands of a multi-band simultaneous enabled system. That is, multi-band simultaneous network stacks 404, 414 may establish an association for each commonly available band of operation. Thereafter at step 604, OS service interface 306 receives a request to establish a communication session between IHS 100 and AP 402. In one embodiment, the request includes one or more desired performance parameters obtained by OS service interface 306 from the application 424 for which the request was initiated. Upon receipt, OS service interface 306 forwards the request to the multi-band simultaneous stack 404 in IHS 100.

At step 606, multi-band simultaneous (MBS) network stack 404 establishes a communication session between IHS 100 and AP 402 over one band (e.g., band 410a) that most optimally meets the desired performance parameters received from the application 424. During the use of the communication session at step 608, OS service interface 306 monitors one or more performance parameters of each of the multiple communication links established at step 602. If it is determined at step 610 that a different band (band 410b) more adequately meets the desired performance parameters received from the application 424 at step 604, processing continues at step 612 in order to initiate a switch over operation; otherwise processing reverts to step 608 to continually monitor the performance parameters of each communication link while the communication session remains on the first band 410a.

At step 612, OS service interface 306 instructs the first band MAC component 406a of IHS 100 to transmit a switch request message to the first band MAC component 416a of AP 402 indicating a desire to perform a switch over. In a particular embodiment involving a multi-band simultaneous network using the FST feature, the request message may be a "FST_Setup_Request" message. AP 402 determines whether or not request is allowed, and if so, the first band MAC component 416a of AP 402 notifies the second band MAC component 416b of AP 402 about one or more communication session parameters of the first communication session carried over the first band 410a. The communication session parameters may include, for example, a channel number, a required bandwidth, a planned switching time/duration, a type of switching mechanism (e.g., one shot switching, AC-by-AC switching, packet-by-packet switching, etc.), and an estimated asynchronous delay between bands (a.k.a., pre-determined stack delay).

At step 614, the first band MAC component 406a of IHS receives a confirmation message (e.g., FST_Setup_Confirm message) indicating that switch over is allowed. Thereafter at step 616, the first band MAC component 406a of IHS 100 notifies the second band MAC component 406b of IHS 100 about the communication session parameters of the first communication session carried over the first band 410a. At step 620, the first band MAC component 416a of AP 402 notifies the second band MAC component 416b of AP 402 about the communication session parameters of first communication session carried over the first band 410a. At this point the first band MAC components 406a, 416a in each of IHS 100 and AP 402 have transferred their communication session parameters to their respective second band MAC components. 406b, 416b.

Thus, by both of IHS 100 and AP 402 notifying its corresponding MAC component of the second (target) band as described above at steps 614-620, an overall amount of time that would otherwise be required to obtain parameters and/or identify, from an active communication session, what those parameters should be on the new target band may be reduced in certain embodiments.

At step 622, IHS 100 and AP 402 may activate a timer for synchronizing certain events of the upcoming switch over. Upon expiration of a first specified time, the second band MAC component 406b of IHS 100 sends an activate request message (e.g., FST_Newband_Activate_Request message) to the second band MAC component 416b of AP 402 at step 624. At step 626, the second band MAC component 416b of AP 402 receives the activate request message and prepares to begin receiving traffic over the second band MAC component 416b of AP 402. Upon expiration of a second specified time, traffic begins to be conveyed through the second band 410b at step 630. Upon expiration of a third specified time, traffic is expected to be completed through the first band 410a, and the first band MAC component 406a of IHS 100 sends a first band teardown request message (e.g., FST_Oldband_Teardown_Request message) to the first band MAC component 416a of AP 402 at step 632. Thereafter at step 634, the first band MAC component 406a of IHS 100 receives a teardown confirmation message (e.g., FST_Oldband_Teardown_Confirm message) to the first band MAC component 416a of AP 402. Upon expiration of fourth specified time, communication session over first band 410a is torn down at step 636.

At this point in time, the communication session has been successfully switched to the second band 410b that more optimally meets the desired performance parameters specified by the application 424 using the communication session.

As described herein, the timer may be used to synchronize a total of four events that occur between IHS 100 and AP 402 for, among other things, reducing an overall time required to perform the switch over process. Nevertheless, it should be appreciated that the timer may be configured to synchronize fewer than four events (e.g., three or less events) or more than four events (e.g., five or more events) without departing from the spirit and scope of the present disclosure.

Additionally as described herein, the method 600 may be performed using standard messages (FST_Setup_Request message, FST_Setup_Confirm message, FST_Newband_Activate_Request message, FST_Newband_Activate_Confirm message, FST_Oldband_Teardown_Request message, and FST_Oldband_Teardown_Confirm message, etc.) already available in the FST feature of an multi-band simultaneous wireless network. Thus, embodiments of the present disclosure may provide an advantage in that the FST feature does not need to be augmented or updated to include additional message(s) other than what is currently provided in the FST feature.

Regarding the topology of the multi-band simultaneous switching system 500 as shown and described herein above with reference to FIG. 5, only those steps described above for the purpose of notifying a second MAC component of IHS 100 associated with a target band by its first MAC component associated with a first band currently conveying the communication session would be performed. That is, because the MAC component in each AP of multi-band simultaneous switching system exists in a separate AP, they would not directly communicate with one another, and thus, there would be no communication session parameters to be shared.

The method 600 described above may be repeatedly performed by OS service and MAC components of multi-band simultaneous service of IHS 100 and AP 402 each time a switch over from one band to another in a multi-band simultaneous wireless network is performed. Nevertheless, when use of the method 600 is no longer needed or desired, the process ends.

Although FIGS. 6A and 6B describe one example of a method that may be performed to switch from one band to another in a multi-band simultaneous wireless network, the features of the disclosed process may be embodied in other specific forms without deviating from the spirit and scope of the present disclosure. For example, method 600 may perform additional, fewer, or different operations than those operations as described in the present example. As another example, the steps of the process described herein may be performed in a different sequence than what is described herein without departing from the spirit and scope of the present disclosure.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
establish a communication session conveyed through a first band provided by an access point having a multi-band simultaneous protocol;
determine, according to an access category (AC) of traffic conveyed through the first band, that the communication session should be conveyed through a second band provided by the access point (AP) because one or more performance parameters measured for the second band are more suitable for use with the traffic than the one or more performance parameters measured for the first band;
transmit one or more communication session parameters associated with the communication session to the access point, the communication session parameters used by a first band media access control (MAC) component of the IHS to provide the communication session, wherein the communication session parameters are configured to prepare a second band MAC component of a second band provided by the AP to convey the communication session;

transmit the communication session parameters to a second band MAC component of the IHS to prepare the second band MAC component of the IHS to convey the communication session over the second band; and after transmission of the communication session parameters to the second band MAC component of the IHS and the second band MAC component of the AP, initiate a switch over to the second band.

2. The IHS of claim 1, wherein the instructions, when executed by the processor further cause the IHS to monitor one or more measured performance parameters of the first band to determine that the communication session should be conveyed through the second band.

3. The IHS of claim 2, wherein the instructions, when executed by the processor further cause the IHS to compare the measured performance parameters against one or more desired performance parameters received from an application executed on the IHS to determine that the communication session should be conveyed through the second band.

4. The IHS of claim 1, wherein the instructions, when executed by the processor further cause the IHS to, at a first specified period of time, begin to convey the communication session between the IHS and access point over the second band, the first specified period of time maintained by a timer configured in each of the IHS and the AP.

5. The IHS of claim 1, wherein the instructions, when executed by the processor further cause the IHS to, at a second specified period of time, tear down the communication session conveyed through the first band.

6. The IHS of claim 1, wherein the multi-band simultaneous protocol comprises a dual band simultaneous (DBS) protocol, and wherein the first and second band each comprises at least one of a 2.4 GHz band, a 5.0 GHz band, or a 60 GHz band of a Wi-Fi protocol.

7. The IHS of claim 6, wherein the instructions, when executed by the processor further cause the IHS to transmit the communication session parameters using a plurality of messages provided by a fast session transfer (FST) feature of the DBS protocol.

8. The IHS of claim 1, wherein the communication session parameters comprise at least one of a channel number, a required bandwidth, a planned switching duration, a type of switching mechanism, and an estimated asynchronous delay between bands.

9. A method comprising:

establishing, using instructions stored in at least one memory and executed by at least one processor, a communication session conveyed through a first band provided by an access point having a multi-band simultaneous protocol;

determining, using the instructions executed by the processor, that the communication session should be conveyed through a second band provided by the access point (AP) according to an access category (AC) of traffic conveyed through the first band because one or more performance parameters measured for the second band are more suitable for use with the traffic than the one or more performance parameters measured for the first band;

transmitting, using the instructions executed by the processor, one or more communication session parameters associated with the communication session to the access point, the communication session parameters used by a first band media access control (MAC) component of the IHS to provide the communication session, wherein the communication session parameters are configured to prepare a second band MAC component of a second band provided by the AP to convey the communication session;

transmitting, using the instructions executed by the processor, the communication session parameters to a second band MAC component of the IHS to prepare the second band MAC component of the IHS to convey the communication session over the second band; and after transmitting the communication session parameters to the second band MAC component of an Information Handling System (IHS) and the second band MAC component of the AP, initiating a switch over to the second band.

10. The method of claim 9, further comprising determining that the communication session should be conveyed through the second band by monitoring one or more measured performance parameters of the first band.

11. The method of claim 10, further comprising determining that the communication session should be conveyed through the second band by comparing the measured performance parameters against one or more desired performance parameters received from an application executed on the IHS.

12. The method of claim 9, further comprising, at a first specified period of time, begin conveying the communication session between the IHS and access point over the second band, the first specified period of time maintained by a timer configured in each of the IHS and the AP.

13. The method of claim 9, further comprising, at a second specified period of time, tearing down the communication session conveyed through the first band.

14. The method of claim 9, further comprising transmitting the communication session parameters using a plurality of messages provided by a fast session transfer (FST) feature of a dual-band simultaneous (DBS) protocol.

15. The method of claim 9, wherein the communication session parameters comprise at least one of a channel number, a required bandwidth, a planned switching duration, a type of switching mechanism, and an estimated asynchronous delay between bands.

16. A non-transitory memory device having program instructions stored thereon that, upon execution by a processor of an Information Handling System (IHS), cause the IHS to:

establish a communication session conveyed through a first band provided by an access point having a multi-band simultaneous protocol;

determine that the communication session should be conveyed through a second band provided by the access point (AP) according to an access category (AC) of traffic conveyed through the first band because one or more performance parameters measured for the second band are more suitable for use with the traffic than the one or more performance parameters measured for the first band;

transmit one or more communication session parameters associated with the communication session to the access point, the communication session parameters used by a first band media access control (MAC) component of the IHS to provide the communication session, wherein the communication session parameters are configured to prepare a second band MAC component of a second band provided by the AP to convey the communication session;

transmit the communication session parameters to a second band MAC component of the IHS to prepare the second band MAC component of the IHS to convey the communication session over the second band; and after transmission of the communication session parameters to the second band MAC component of the IHS and the second band MAC component of the AP, initiate a switch over to the second band.

* * * * *